United States Patent
Cargnelli et al.

(10) Patent No.: US 7,018,732 B2
(45) Date of Patent: Mar. 28, 2006

(54) SYSTEM AND METHOD FOR MANAGEMENT OF GAS AND WATER IN FUEL CELL SYSTEM

(75) Inventors: Joseph Cargnelli, Toronto (CA); Todd A. Simpson, Brampton (CA); Robert C. Del Core, Etobicoke (CA); Stephen Burany, Thornhill (CA); Jianming Ye, Woodbridge (CA); Ricardo Bazzarella, Cambridge (CA)

(73) Assignee: Hydrogenics Corporation, Mississauga (CA)

( * ) Notice: Subject to any disclaimer, the term of this patent is extended or adjusted under 35 U.S.C. 154(b) by 283 days.

(21) Appl. No.: 10/122,125

(22) Filed: Apr. 15, 2002

(65) Prior Publication Data

US 2003/0194590 A1 Oct. 16, 2003

(51) Int. Cl.
H01M 8/04 (2006.01)
(52) U.S. Cl. .............................. 429/13; 429/17; 429/22; 429/26
(58) Field of Classification Search .................. 429/13, 429/17, 19, 22, 26
See application file for complete search history.

(56) References Cited

U.S. PATENT DOCUMENTS

| | | | |
|---|---|---|---|
| 5,786,104 A | 7/1998 | Black et al. | |
| 5,996,976 A | 12/1999 | Murphy et al. | |
| 6,013,385 A | 1/2000 | DuBose | |
| 6,106,964 A * | 8/2000 | Voss et al. | 429/20 |
| 6,117,577 A | 9/2000 | Wilson | |
| 6,329,090 B1 | 12/2001 | McElroy et al. | |
| 6,630,260 B1 * | 10/2003 | Forte et al. | 429/19 |
| 2001/0004500 A1 | 6/2001 | Grasso et al. | |
| 2001/0012575 A1 | 8/2001 | Katagiri et al. | |
| 2002/0006537 A1 | 1/2002 | Kobayashi et al. | |
| 2002/0015867 A1 | 2/2002 | Cargnelli et al. | |
| 2002/0155328 A1 | 10/2002 | Smith et al. | |
| 2003/0031906 A1 | 2/2003 | Cargnelli et al. | |

FOREIGN PATENT DOCUMENTS

| | | |
|---|---|---|
| DE | 19902219 C1 | 6/2000 |
| DE | 10021946 A1 | 7/2001 |
| WO | WO 01/97311 A2 | 12/2001 |
| WO | WO 02/11224 A2 | 2/2002 |

OTHER PUBLICATIONS

Stephen Gurski and Douglas J. Nelson, "Design and Integration for a Fuel Cell Hybrid Electric Sport Utility Vehicle", SAE 2002 World Congress Detroit, Michigan; Mar. 4-7, 2002.

* cited by examiner

Primary Examiner—Jonathan Crepeau
(74) Attorney, Agent, or Firm—Bereskin & Parr

(57) ABSTRACT

A fuel cell system has: a fuel cell having a first reactant inlet, a first reactant outlet, a second reactant inlet, a second reactant outlet, and optionally a coolant inlet and coolant outlet. A first reactant supply subsystem supplies a first reactant incoming stream to the first reactant inlet of the fuel cell. A second reactant supply subsystem supplies a second reactant incoming stream to the second reactant inlet of the fuel cell. A first reactant recirculation subsystem recirculates at least a portion of the first reactant exhaust stream from the first reactant outlet to an enthalpy shifting subsystem in which one portion of the heat and moisture in first reactant exhaust stream is transferred to one of the first reactant incoming stream in the first reactant supply subsystem and the second reactant incoming stream in the second reactant supply subsystem. Another portion of the heat and moisture is transferred to the other stream. A method of controlling reactant and water in a fuel cell system is also disclosed.

33 Claims, 3 Drawing Sheets

SYSTEM AND METHOD FOR MANAGEMENT OF GAS AND WATER IN FUEL CELL SYSTEM

FIELD OF THE INVENTION

The present invention relates generally to an apparatus and method for management of process gases for a fuel cell system. More particularly, the present invention relates to an apparatus and method for controlling the humidity, temperature and flow of fuel cell process gases.

BACKGROUND OF THE INVENTION

Fuel cell systems are seen as a promising alternative to traditional power generation technologies due to their low emissions, high efficiency and ease of operation. Fuel cells operate to convert chemical energy into electrical energy. Proton exchange membrane fuel cells comprise an anode, a cathode, and a selective electrolytic membrane disposed between the two electrodes. In a catalyzed reaction, a fuel such as hydrogen, is oxidized at the anode to form cations (protons) and electrons. The ion exchange membrane facilitates the migration of protons from the anode to the cathode. The electrons cannot pass through the membrane and are forced to flow through an external circuit thus providing an electrical current. At the cathode, oxygen reacts at the catalyst layer, with electrons returned from the electrical circuit, to form anions. The anions formed at the cathode react with the protons that have crossed the membrane to form liquid water as the reaction product.

Proton exchange membranes require a wet surface to facilitate the conduction of protons from the anode to the cathode, and otherwise to maintain the membranes electrically conductive. It has been suggested that each proton that moves through the membrane drags at least two or three water molecules with it (U.S. Pat. No. 5,996,976). U.S. Pat. No. 5,786,104 describes in more qualitative terms a mechanism termed "water pumping", which results in the transport of cations (protons) with water molecules through the membrane. As the current density increases, the number of water molecules moved through the membrane also increases. Eventually the flux of water being pulled through the membrane by the proton flux exceeds the rate at which water is replenished by diffusion. At this point the membrane begins to dry out, at least on the anode side, and its internal resistance increases. It will be appreciated that this mechanism drives water to the cathode side, and additionally the water created by reaction is formed at the cathode side. Nonetheless, it is possible for the flow of gas across the cathode side to be sufficient to remove this water, resulting in drying out on the cathode side as well. Accordingly, the surface of the membrane must remain moist at all times. Therefore, to ensure adequate efficiency, the process gases must have, on entering the fuel cell, appropriate humidity and temperature which are based on the system requirements.

A further consideration is that there is an increasing interest in using fuel cells in transport and like applications, e.g. as the basic power source for cars, buses and even larger vehicles. Automotive application, are quite different from many stationary applications. For example in stationary applications, fuel cell stacks are commonly used as an electrical power source and are simply expected to run at a relatively constant power level for an extended period of time. In contrast, in an automotive environment, the actual power required from the fuel cell stack can vary widely. Additionally, the fuel cell stack supply unit is expected to respond rapidly to changes in power demand, whether these be demands for increased or reduced power, while maintaining high efficiencies. Further, for automotive applications, a fuel cell power unit is expected to operate under an extreme range of ambient temperature and humidity conditions.

All of these requirement are exceedingly demanding and make it difficult to ensure a fuel cell stack will operate efficiently under all the possible range of operating conditions. While the key issues are ensuring that a fuel cell power unit can always supply a high power level and at a high efficiency and simultaneously ensuring that it has a long life, accurately controlling humidity levels within the fuel cell power unit is necessary to meet these requirements. More particularly, it is necessary to control humidity levels in both the oxidant and fuel gas streams. Most known techniques of humidification are ill designed to respond to rapidly changing conditions, temperatures and the like. Many known systems can provide inadequate humidification levels, and may have high thermal inertia and/or large dead volumes, so as to render them incapable of rapid response to changing conditions.

An apparatus and method of controlling temperature and humidity in fuel cell systems is disclosed in the applicant's co-pending U.S. patent application Ser. No. 09/801,916. The method comprises humidifying a fuel cell process gas stream at a first temperature so as to provide the process gas stream with excess humidity, cooling the process gas stream at a second temperature, lower than the first temperature, to cause condensation of excess moisture, removing excess condensed moisture from the process gas stream and delivering the process gas stream at a known temperature, whereby the relative humidity level in the process gas stream is determined from the ratio of the saturation pressures of the second and the said known temperatures. Particularly, the method includes recovering humidity from the exhausted process gas generated by the fuel cell and using the recovered moisture to humidify the incoming at least one of the fuel and oxidant streams. However, this method requires a large number of components and hence reduces the overall efficiency of the fuel cell system.

Another method is disclosed in U.S. Pat. No. 6,013,385. In this patent, a fuel cell gas management system is disclosed. The system comprises: a first reactant humidification subsystem for supplying a first reactant inlet stream to the first reactant inlet of the fuel cell and receiving a first reactant exhaust stream from the first reactant outlet of the fuel cell, said first reactant humidification subsystem comprising an enthalpy wheel for collecting moisture from the first reactant (oxidant) exhaust stream and transferring a portion of the collected moisture to the first reactant inlet stream; a second reactant (fuel) humidity retention subsystem comprising a recirculation loop for collecting excess second reactant from the second reactant outlet of the fuel cell, a source of second reactant mixing means for mixing second reactant from a reactant source with second reactant collected from the second reactant outlet of the fuel cell and motive means for circulating second reactant in said recirculation loop and for introducing second reactant into the second reactant inlet of the fuel cell. However, this patent still fails to fully utilize the waste heat and humidity from fuel cell exhaust.

There remains a need for a fuel cell gas management system that can offer rapid dynamic control of temperatures and relative humidities for incoming fuel cell process gases. More particularly, such a system should be highly efficient and be able to provide sufficient humidity over a wide variety of flow rates, for both the oxidant and fuel systems.

SUMMARY OF THE INVENTION

In accordance with one aspect of the present invention, there is provided a fuel cell system comprising;

a fuel cell having a first reactant inlet, a first reactant outlet, a second reactant inlet, a second reactant outlet, a coolant inlet and coolant outlet;

a first reactant supply subsystem for supplying a first reactant incoming stream to the first reactant inlet of the fuel cell, a second reactant supply subsystem for supplying a second reactant incoming stream to the second reactant inlet of the fuel cell;

a first reactant circulation subsystem for circulating at least a portion of the first reactant exhaust stream from the first reactant outlet through an enthalpy shifting subsystem in which at least a portion of the heat and moisture of the first reactant exhaust stream is transferred to at least one of the first reactant incoming stream in the first reactant supply subsystem and the second reactant incoming stream in the second reactant supply subsystem.

The enthalpy shifting subsystem comprises a first enthalpy shifting device that comprises an integral unit for both extracting at least a portion of the heat and moisture from the first reactant exhaust stream and transferring heat and moisture to the first reactant incoming stream in the first reactant supply subsystem, and a second enthalpy shifting device that comprises an integral unit for both extracting at least a portion of the heat and moisture from the first reactant exhaust stream, and transferring heat and moisture to the second reactant incoming stream in the second reactant supply subsystem.

More preferably, the fuel cell system further comprises a second reactant recirculation system for recirculating at least a portion of the second reactant exhaust stream from the second reactant outlet to the second reactant supply subsystem so that the at least a portion of the second reactant exhaust stream mixes with the second reactant incoming stream.

In accordance with another aspect of the present invention, there is provided a method of controlling the reactants and water in a fuel cell system, the fuel cell has a first reactant inlet, a first reactant outlet, a second reactant inlet, a second reactant outlet, a coolant inlet and coolant outlet, said method comprises:

(a) providing a first reactant incoming stream to be supplied to the first reactant inlet;

(b) providing a second reactant incoming stream to be supplied to the second reactant inlet;

(c) circulating at least a portion of a first reactant exhaust stream from the first reactant outlet through first and second enthalpy shifting devices;

(d) in the first enthalpy shifting device, extracting at least a portion of the heat and moisture in the first reactant exhaust stream and transferring heat and moisture to the first reactant incoming stream and, in the second enthalpy shifting device, extracting another portion of the heat and moisture in the first reactant exhaust stream and transferring heat and moisture to the second reactant incoming stream.

More preferably, the method further comprises: collecting at least a portion of a second reactant exhaust stream from the second reactant outlet; and mixing the at least a portion of the second reactant exhaust stream with the second reactant incoming stream.

The present invention has many advantages over the prior art. The only onboard fluid in the present invention is the coolant. All the water used to humidify the fuel and oxidant is generated by the fuel cell 12 itself. This reduces the weight and number of components in the system, making the overall system compact and highly efficient. The system is capable of rapid response of power demand. All these features are particularly desirable for vehicular applications.

BRIEF DESCRIPTION OF THE DRAWING FIGURES

For a better understanding of the present invention, and to show more clearly how it may be carried into effect, reference will now be made, by way of example, to the accompanying drawings, which show a preferred embodiment of the present invention and in which.

DESCRIPTION OF THE PREFERRED EMBODIMENT

Figure 1:
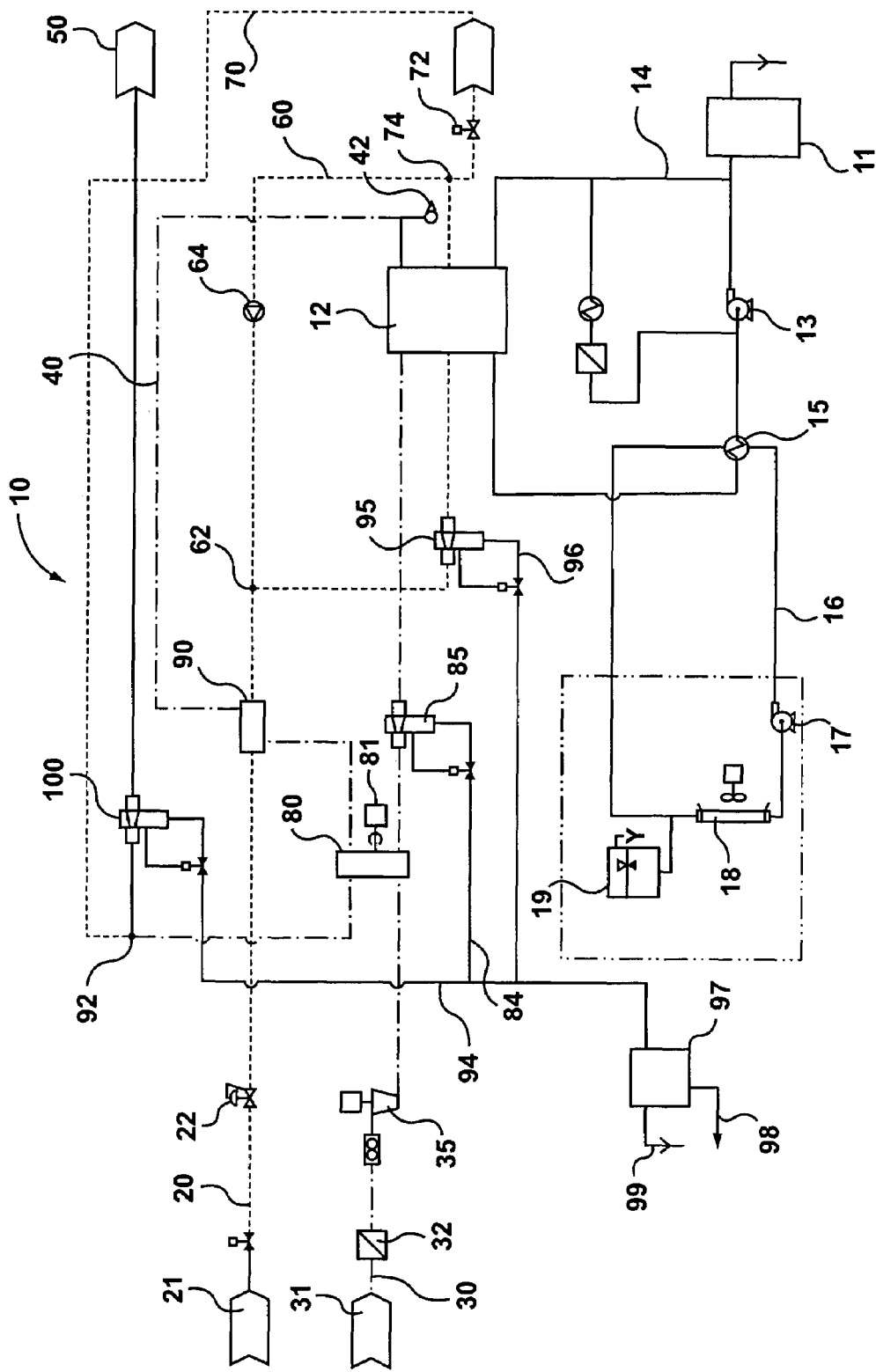
FIG. 1 illustrates a schematic flow diagram of a first embodiment of a fuel cell gas and water management system according to the present invention.

Referring first to FIG. 1, this shows a schematic flow diagram of a first embodiment of a fuel cell gas management system 10 according to the present invention. The fuel cell gas management system 10 comprises a fuel supply line 20, an oxidant supply line 30, a cathode exhaust recirculation line 40 and an anode exhaust recirculation line 60, all connected to a fuel cell 12. It is to be understood that the fuel cell 12 may comprise a plurality of fuel cells or just a single fuel cell. For simplicity, the fuel cell 12 described herein operates on hydrogen as fuel and air as oxidant and can be a Proton Exchange Membrane (PEM) fuel cell. However, the present invention is not limited to this type of fuel cells and applicable to other types of fuel cells.

The fuel supply line 20 is connected to a fuel source 21 for supplying hydrogen to the anode of the fuel cell 12. A hydrogen humidifier 90 is disposed in the fuel supply line 20 upstream from the fuel cell 12 and an anode water separator 95 is disposed between the hydrogen humidifier 90 and the fuel cell 12. The oxidant supply line 30 is connected to an oxidant source 31, e.g. ambient air, for supplying air to the cathode of the fuel cell 12. An enthalpy wheel 80 is disposed in the oxidant supply line 30 upstream of the fuel cell 12 and also in the cathode recirculation line 40. A cathode water separator 85 is disposed between the enthalpy wheel 80 and the fuel cell 12. The enthalpy wheel 80 comprises porous materials with a desiccant. In known manner, a motor 81 drives either the porous materials or a gas diverting element to rotate around the axis of the enthalpy wheel so that gases from the oxidant supply line 30 and the oxidant recirculation line 40 alternately pass through the porous materials of the enthalpy wheel. Dry ambient air enters the oxidant supply line 30 and first passes through an air filter 32 that filters out the impurity particles. A blower 35 is disposed upstream of the enthalpy wheel 80, to draw air from the air filter 32 and to pass the air through a first region of the enthalpy wheel 80.

The enthalpy is wheel 80 may be any commercially available enthalpy wheel suitable for fuel cell system, such as the one described in the applicant's co-pending U.S. patent application Ser. No. 09/941,934.

A fuel cell cathode exhaust stream contains excess air, product water and water transported from the anode side, the air being nitrogen rich due to consumption of at least part of the oxygen in the fuel cell 12. The cathode exhaust stream is recirculated through the cathode exhaust recirculation line 40 connected to the cathode outlet of the fuel cell 12. The humid cathode exhaust stream first passes through a hydrogen humidifier 90 in which the heat and humidity is transferred to incoming dry hydrogen in the fuel supply line 20. The humidifier 90 can be any suitable humidifier, such as that commercially available from Perma Pure Inc, Toms River, N.J. It may also be a membrane humidifier and other types of humidifier with either high or low saturation efficiency. In view of the gases in the anode and cathode streams, an enthalpy wheel or other device permitting significant heat and humidity interchange between the two streams cannot be used.

From the hydrogen humidifier 90, the fuel cell cathode exhaust stream continues to flow along the recirculation line 40 and passes through a second region of the enthalpy wheel 80, as mentioned above. As the humid cathode exhaust passes through the second region of the enthalpy wheel 80, the heal and moisture is extracted from the cathode exhaust and retained in the porous paper or fiber material of the enthalpy wheel 80 and is then transferred to the incoming dry air stream passing through the first region of the enthalpy wheel 80 in the oxidant supply line 30, as the porous materials or the gas diverting element of the enthalpy wheel 80 rotate around its axis. Then the cathode exhaust stream continues to flow along the recirculation line 40 to an exhaust water separator 100 in which the excess water, again in liquid form, that has not been transferred to the incoming hydrogen and air streams is separated from the exhaust stream. Then the exhaust stream is discharged to the environment along a discharge line 50.

A drain line 42 may optionally be provided in the recirculation line 40 adjacent the cathode outlet of the fuel cell to drain out any liquid water remaining or condensed out. The drain line 42 may be suitably sized so that gas bubbles in the drain line actually retain the water in the drain line and automatically drain water on a substantially regular basis, thereby avoiding the need of a drain valve that is commonly used in the field to drain water out of gas stream. Such a drain line can be used anywhere in the system where liquid water needs to be drained out from gas streams. Pressure typically increases with gas flow rate and water regularly produced or condensed, and a small flow rate of gas is not detrimental such as cathode exhaust water knockout separator and drain line 42.

The humidified hydrogen from the hydrogen humidifier 90 flows along the fuel supply line 20 to an anode water separator 95 in which excess water is separated before the hydrogen enters the fuel cell 12. Likewise, the humidified air from the enthalpy wheel 80 flows along the oxidant supply line 30 to a cathode water separator 85 in which excess liquid water is separated before the air enters the fuel cell 12.

Fuel cell anode exhaust comprising excess hydrogen and water is recirculated by a pump 64 along an anode recirculation line 60 connected to the anode outlet of the fuel cell 12. The anode recirculation line 60 connects to the fuel supply line 20 at a joint 62 upstream from the anode water separator 95. The recirculation of the excess hydrogen together with water vapor not only permits utilization of hydrogen to the greatest possible extent and prevents liquid water from blocking hydrogen reactant delivery to the reactant sites, but also achieves self-humidification of the fuel stream since the water vapor from the recirculated hydrogen humidifies the incoming hydrogen from the hydrogen humidifier 90. This is highly desirable since this arrangement offers more flexibility in the choice of hydrogen humidifier 90 as the humidifier 90 does not then need to be a highly efficient one in the present system. By appropriately selecting the hydrogen recirculation flow rate, the required efficiency of the hydrogen humidifier 90 can be minimized. For example, supposing the fuel cell 12 needs 1 unit of hydrogen, hydrogen can be supplied from the hydrogen source in the amount of 3 units with 2 units of excess hydrogen recirculated together with water vapor. The speed of pump 64 may be varied to adjust the portion of recirculated hydrogen in the mixture of hydrogen downstream from joint 62. The selection of stoichiometry and pump 64 speed may eventually lead to the omission of the hydrogen humidifier 90

In practice, since air is used as oxidant, it has been found that nitrogen crossover from the cathode side of the fuel cell to the anode side can occur, e.g. through the membrane of a PEM fuel cell. Therefore, the anode exhaust actually contains some nitrogen and possibly other impurities. Recirculation of anode exhaust may result in the build-up of nitrogen and poison the full cell. Preferably, a hydrogen purge line 70 branches out from the fuel recirculation line 60 from a position 74 adjacent the fuel cell cathode outlet. A purge control device 72 is disposed in the hydrogen purge line 70 to purge a portion of the anode exhaust out of the recirculation line 60. The frequency and flow rate of the purge operation is dependent on the power on which the fuel cell 12 is running. When the fuel cell 12 is running on high power, it is desirable to purge a higher portion of anode exhaust. The purge control device 72 may be a solenoid valve or other suitable device.

The hydrogen purge line 70 runs from the position 74 to a joint point 92 at which it joins the cathode exhaust recirculation line 40. Then the mixture of purged hydrogen and the cathode exhaust from the enthalpy wheel 80 passes through the exhaust water separator 100. Water is condensed in the water separator 100 and the remaining gas mixture is discharged to the environment along the discharge line 50. Alternatively, either the cathode exhaust recirculation line 40 or the purge line 70 can be connected directly into the water separator 100.

Preferably, water separated by the anode water separator 95, cathode water separator 85, and the exhaust water separator 100 are not discharged, but rather the water is recovered respectively along line 96, line 84 and line 94 to a product water tank 97, for use in various processes. For this purpose, the tank 97 includes a line 98 for connection to other processes and a drain 99.

As is known to those skilled in the art, a coolant loop 14 runs through the fuel cell 12. A pump 13 is disposed in the cooling loop 14 for circulating the coolant. The coolant may be any coolant commonly used in the field, such as any nonconductive water, glycol, etc. An expansion tank 11 can be provided in known manner. A heat exchanger 15 is provided in the cooling loop 14 for cooling the coolant flowing through the fuel cell 12 to maintain the coolant in appropriate temperature range.

FIG. 1 shows one variant, in which a secondary loop 16 includes a pump 17, to circulate a secondary coolant. A heat exchanger 18, e.g. a radiator, is provided to maintain the temperature of the coolant in the secondary loop and again, where required, an expansion tank 19 is provided. The coolant in the cooling loop 16 may be any type of coolant as the cooling loop 14 and 16 do not mix.

Figure 2:
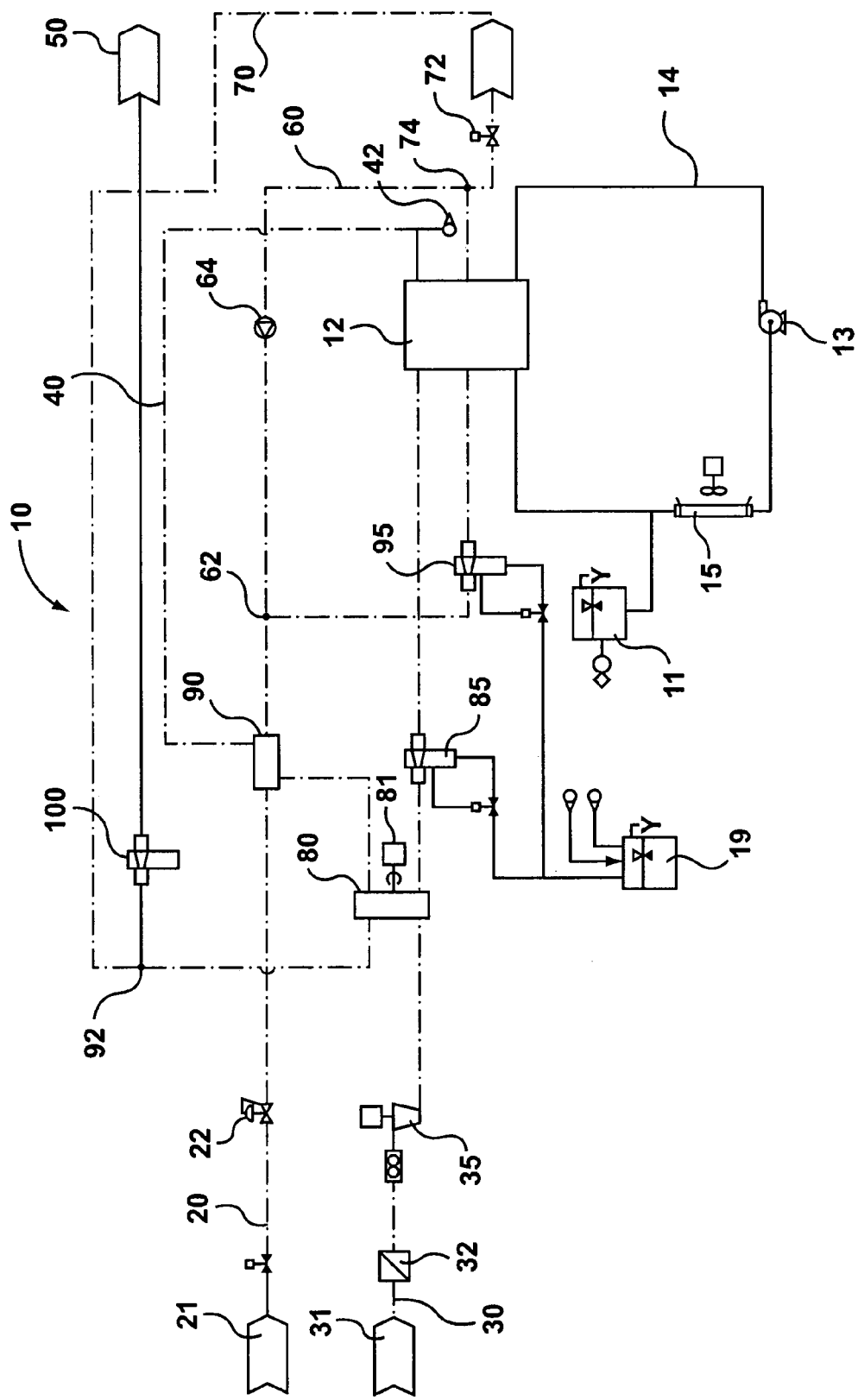
FIG. 2 illustrates a variant of the first embodiment of the fuel cell gas and water management system according to the present invention, in which only one cooling loop is shown.

However, it is to be understood that the separate second cooling loop is not essential. Instead, as shown in FIG. 2, a heat exchanger 15', e.g. a radiator, is provided in the cooling loop 14 to maintain the temperature of the coolant in the cooling loop 14. In this case, the secondary cooling loop 16 is omitted. It is to be understood that the heat exchanger 15 in FIG. 1 could also be an isolation, brazed plate heat exchanger disposed in an "open" cooling loop, as may be desired in some applications. That is to say, the second cooling loop 16 can be an open cooling loop in which coolant is drawn from and returned to a coolant reservoir, such as atmosphere, sea, etc.

When water is used as coolant in either of the above variants, since the water from the separators 95, 85, 100 is product water from the fuel cell, and hence pure and non-conductive, it can be collected and directed to the expansion tank 11 or 19, or coolant reservoir as coolant during the fuel cell operation.

Preferably, a flow regulating device 22 is disposed in the fuel supply line 20 upstream from the hydrogen humidifier 90. The flow regulating device or valve 22 permits the flow of hydrogen from the hydrogen source 21 to the fuel cell 12 in response to the pressure drop in the fuel supply line 20. The flow regulating device 22 may be a forward pressure regulator having a set point and it permits hydrogen to be supplied to the fuel cell 12 when the pressure in the fuel supply line 20 is below the set point due to the hydrogen consumption in the fuel cell 12. This forward pressure regulator avoids the need for an expensive mass flow controller and provides more rapid response and accurate flow control. To provide more control flexibility, the flow regulating means 22 may comprise a plurality of pre-set forward pressure regulators arranged in parallel with each forward pressure regulator having a different set point. This makes it possible to operate the fuel cell 12 with fuel supplied at different pressures and different rates at each pressure.

It is to be understood that although in this embodiment, the cathode exhaust is used to first humidify the incoming hydrogen and then the incoming air, this order is not essential. Instead, the cathode exhaust may be used to first humidify the incoming air and then the incoming hydrogen. Alternatively, the hydrogen humidifier 90 and the enthalpy wheel 80 may be placed in parallel instead of series in the cathode exhaust recirculation line 60, so that the humidification of both hydrogen and air occurs simultaneously. Optionally, depending on the operation condition of the fuel cell 12, when the simultaneous humidification is employed, a line (not shown) may be further provided to connect the hydrogen humidifier 90 and the enthalpy wheel 80 in series so that the cathode exhaust first humidifies, for example, hydrogen in the hydrogen humidifier 90 and then the air in the enthalpy wheel 80 with a portion of the cathode exhaust bypassing the hydrogen humidifier 90.

However, in practice it may be preferable to humidify hydrogen stream first since anode dew point temperature is desired to be higher than the cathode dew point temperature because water is naturally transferred from the anode to the cathode in the fuel cell 12. The desired relative humidity of hydrogen is also often higher than that of air in the fuel cell 12 so that the fuel cell 12 will not be flooded. Therefore, it is preferable to use the cathode exhaust stream to exchange heat and humidity with incoming hydrogen stream first.

In known manner, various sensors can be provided for measuring parameters of the steam of fuel, oxidant and coolant, supplied to the fuel cell 12. Another aspect of the present invention relies on measuring just the temperature of the reactants and determining humidity from known temperature—humidity characteristics, i.e. without directly measuring humidity.

It can be appreciated that in the present invention it is not essential to over saturate process gases, condense water out to obtain 100% relative humidity and then deliver the process gases at certain temperature to get desired relative humidity before they enter the fuel cell 12, as in the applicant's co-pending U.S. patent application Ser. No. 09/801,916. The present system is applicable to fuel cell systems where fuel and oxidant stream either have or do not have 100% relative humidity. An anode dew point heat exchanger and a cathode dew point heat exchanger may be provided to control the humidity of fuel and oxidant when the fuel cell 12 is not operable with fuel or oxidant having 100% relative humidity. However, this totally depends on the characteristic of the fuel cell 12, such as the operating condition of the proton exchange membrane.

Figure 3:
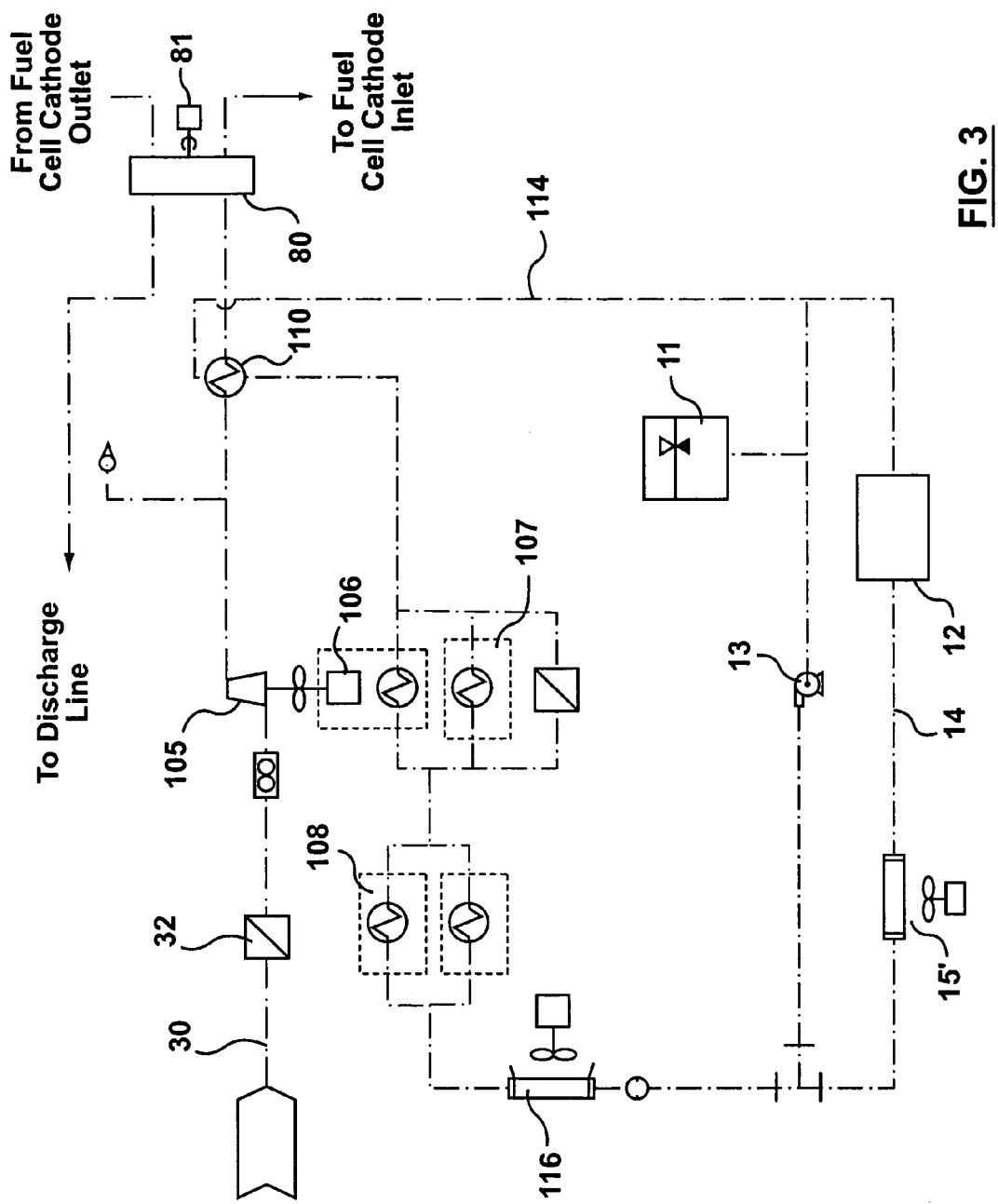
FIG. 3 illustrates a partial schematic flow diagram of a second embodiment of the fuel cell gas and water management system according to the present invention operating under high pressure.

It is also to be understood that this first embodiment of the fuel cell system according to the present invention operates under ambient pressure or near ambient pressure. Now, referring to FIG. 3, this shows cooling loops for use in a second embodiment of the fuel cell system of the present invention, that operates under high pressure, i.e. greater than atmospheric pressure.

In the second embodiment, similar components are indicated with same reference numbers, and for simplicity and brevity, the description of those components is not repeated.

In this second embodiment, a high pressure compressor 105 is provided in the oxidant supply line 30 upstream from the enthalpy wheel 80 to pressurize the incoming air from the air filter 32. An after cooler heat exchanger 110 is provided between the compressor 105 and the enthalpy wheel 80 to cool the compressed air having an elevated temperature. Hence, in addition to the cooling loop 14 for the fuel cell 12, an additional cooling loop 114 is provided including a water-water heat exchanger 110 and a coolant tank 111. The cooling loop 114 may also run through the compressor motor 106, compressor motor controller 107 and other power switching board 108 for the compressor 105. The coolant in both cooling loops 14 and 114 is driven by the pump 13. A heat exchanger 108 can be provided in the loop 114 for cooling additional components. A radiator 116 with a powered fan is provided in the additional cooling loop 114, as for the radiator 18 in the second cooling loop; again the same alternatives to the heat exchanger 15 apply to the radiator 116.

The present invention has many advantages over the prior art. All the water used to humidify the fuel and oxidant is generated by the fuel cell 12 itself. This reduces the weight and number of components in the system, making the overall system compact and highly efficient. The system is capable of rapid response to power demands. All these features are particularly desirable for vehicular applications.

While the above description constitutes the preferred embodiments, it will be appreciated that the present invention is susceptible to modification and change without departing from the fair meaning of the proper scope of the accompanying claims. For example, the present invention might have applicability in various types of fuel cells, which include but are not limited to, solid oxide, alkaline, molton-carbonate, and phosphoric acid. In particular, the present invention may be applied to fuel cells which operate at much higher temperatures. As will be appreciated by those skilled in the art, the requirement for humidification is very dependent on the electrolyte used and also the temperature and pressure of operation of the fuel cell. Accordingly, it will be understood that the present invention may not be applicable to many types of fuel cells.

What is claimed is:

1. A fuel cell system comprising:
   (a) a fuel cell having a first reactant inlet, a first reactant outlet, a second reactant inlet, a second reactant outlet, a coolant inlet and coolant outlet;
   (b) a first reactant supply subsystem for supplying a first reactant incoming stream to the first reactant inlet of the fuel cell;
   (c) a second reactant supply subsystem for supplying a second reactant incoming stream to the second reactant inlet of the fuel cell;
   (d) an enthalpy shifting subsystem comprising a first enthalpy shifting device that comprises an integral unit for both extracting at least a portion of the heat and moisture from the first reactant exhaust stream and transferring heat and moisture to the first reactant incoming stream in the first reactant supply subsystem, and a second enthalpy shifting device that comprises an integral unit for both extracting at least a portion of the heat and moisture from the first reactant exhaust stream and transferring heat and moisture to the second reactant incoming stream in the second reactant supply subsystem;
   (e) a first reactant circulation subsystem for circulating at least a portion of a first reactant exhaust stream from the first reactant outlet through the enthalpy shifting subsystem for transfer of heat and moisture from the first reactant exhaust stream to the first reactant incoming stream in the first reactant supply subsystem and the second reactant incoming stream in the second reactant supply subsystem;
   wherein the first and second enthalpy shifting devices are connected in the series in the enthalpy shifting subsystem, such that the heat and moisture from the first reactant exhaust stream is first transferred to the second reactant incoming stream through the second enthalpy shifting device and then to the first reactant incoming stream through the first enthalpy shifting device, and
   wherein the enthalpy shifting system further comprises a bypass line that bypasses the second enthalpy shifting device so that a portion of the first reactant exhaust stream in the first reactant circulation subsystem flows to the first enthalpy shifting device without passing through the second enthalpy shifting device.

2. A fuel cell system as claimed in claim 1, further comprising a second reactant recirculation system for recirculating at least a portion of a second reactant exhaust stream from the second reactant outlet to the second reactant supply subsystem, whereby the at least a portion of the second reactant exhaust stream mixes with the second reactant incoming stream.

3. A fuel cell system as claimed in claim 2, wherein the second reactant supply subsystem comprises a flow regulating means for regulating the flow rate of the second reactant incoming stream supplied to the second reactant inlet of the fuel cell.

4. A fuel cell system as claimed in claim 3, wherein the flow regulating means is at least one forward pressure regulator.

5. A fuel cell system as clamed in claim 4, wherein the flow regulating means comprises a plurality of forward pressure regulators, each having a different set point.

6. A fuel cell system as claimed in claim 3, wherein a draining means is provided in the first reactant circulation subsystem adjacent the first reactant outlet to drain at least a portion of the water of the first reactant circulation subsystem.

7. A fuel cell system as claimed in claim 6, wherein the draining means comprises a suitably sized drain line so that water is automatically and regularly drained along the drain line.

8. A fuel cell system as claimed in claim 3, wherein the second reactant supply subsystem comprises a second reactant water separator to separate at least a portion of the water in the second reactant incoming stream after the second reactant incoming stream passes through the second enthalpy shifting device.

9. A fuel cell system as claimed in claim 8, wherein the second reactant water separator is positioned in the second reactant supply subsystem so that it separates water out of the mixture of the at least a portion of the second reactant exhaust stream from the second reactant recirculation subsystem and the second reactant incoming stream.

10. A fuel cell system as claimed in claim 9, wherein the first reactant supply subsystem comprises a first reactant water separator to separate at least a portion of the water in the first reactant incoming stream after the first reactant incoming stream passes through the first enthalpy shifting device.

11. A fuel cell system as claimed in claim 10, further comprising a second reactant purge subsystem that purges at least a portion of the second reactant exhaust stream from the second reactant outlet.

12. A fuel cell system as claimed in claim 11, wherein the second reactant purge subsystem comprises a purge control means for controlling the purge of the at least a portion of the second reactant exhaust stream.

13. A fuel cell system as claimed in claim 12, wherein the purge control means is selected from the group consisting of: a solenoid valve, a proportional solenoid valve and a venturi.

14. A fuel cell system as claimed in claim 13, wherein the enthalpy shifting subsystem has an outlet for discharging the first reactant exhaust stream after the first reactant exhaust stream passes therethrough, and the fuel cell system further comprises a discharge subsystem for mixing the first reactant exhaust from the outlet of the enthalpy shifting subsystem with the second reactant exhaust stream from the second reactant purge subsystem and discharging the mixture.

15. A fuel cell system as claimed in claim 14, wherein the discharge subsystem comprises an exhaust water separator that separates water out of the mixture.

16. A fuel cell system as claimed in claim 15, further comprises a first cooling loop having a coolant tank, coolant is directed from the coolant tank to flow through the fuel cell and return to the coolant tank.

17. A fuel cell system as claimed in claim 16, further comprises a second cooling loop and a first heat exchanger is disposed between the first and second cooling loops to effect heat exchange in non-mixing manner between the coolants in the first and second cooling loops.

18. A fuel cell system as claimed in claim 17, wherein the second cooling loop is an open loop in which coolant is drawn from and returned to a coolant reservoir.

19. A fuel cell system as claimed in claim 16 or 17, wherein water separated from the first reactant water separator, the second reactant water separator and the exhaust water separator is directed to the coolant tank.

20. A fuel cell system as claimed in claim 16, wherein the first reactant supplying subsystem further comprises, upstream of the enthalpy shifting means, a compressing means for compressing and supplying the first reactant to the first reactant inlet of the fuel cell and a second heat exchanger, and wherein the fuel cell system further comprises a third cooling loop that runs through the compressing means and the second heat exchanger to cool the compressing means and the pressurized first reactant stream.

21. A fuel cell system as claimed in claim 2, 3, 8, 11, 14 or 16, wherein the second reactant recirculation system comprises a variable speed pump for recirculating at least a portion of the second reactant exhaust stream in variable flow rate from the second reactant outlet to the second reactant supply subsystem.

22. A method of controlling the reactants and water in a fuel cell system, the fuel cell having a first reactant inlet, a first reactant outlet, a second reactant inlet, a second reactant outlet, said method comprises:
   (a) providing a first reactant incoming stream to the first reactant inlet;
   (b) providing a second reactant incoming stream to the second reactant inlet;
   (c) circulating at least a portion of a first reactant exhaust stream from the first reactant outlet through first and second enthalpy shifting devices, each of the first and second enthalpy shifting devices comprising an integral unit;
   (d) in the first enthalpy shifting device, extracting at least a portion of the heat and moisture in the first reactant exhaust stream and transferring heat and moisture to the first reactant incoming stream and, in the second enthalpy shifting device, extracting another portion of the heat and moisture in the first reactant exhaust stream and transferring heat and moisture to the second reactant incoming stream;
   wherein step (d) comprises transferring said one portion of the heat and moisture of the first reactant exhaust stream first to the second reactant incoming stream and subsequently transferring said other portion of the heat and moisture of the first reactant exhaust stream to the first reactant incoming stream; and
   wherein at least a portion of the first reactant exhaust flows through a bypass line around the second enthalpy shifting device and to the first enthalpy shifting device.

23. A method as claimed in claim 22, further comprises:
   (e) collecting at least a portion of a second reactant exhaust stream from the second reactant outlet;
   (f) mixing the at least a portion of the second reactant exhaust stream with the second reactant incoming stream.

24. A method as claimed in claim 23, wherein step (b) includes regulating the flow of the second reactant incoming stream to provide dynamic supply of the second reactant incoming stream in response to the demand from the fuel cell.

25. A method as claimed in claim 24, wherein step (f) further comprises: separating water from the mixture of the at least a portion of the second reactant exhaust stream and the second reactant incoming stream.

26. A method as claimed in claim 25, wherein step (d) further comprises separating water from the first reactant incoming stream.

27. A method as claimed in claim 26, wherein step (e) further comprises purging at least a portion of the second reactant exhaust stream from the second reactant outlet.

28. A method as claimed in claim 27, further comprises;
   (g) mixing the first reactant exhaust stream after said one portion and said other portion thereof have transferred heat and moisture to both the first reactant incoming stream and the second reactant incoming stream, with the purged second reactant exhaust stream;
   (h) discharging the mixture.

29. A method as claimed in claim 28, wherein step (g) further comprises: separating water from the mixture.

30. A method as claimed in claim 29, further comprises: cooling the fuel cell stack with a coolant running through a coolant loop.

31. A method as claimed in claim 30, wherein step (a) includes compressing the first reactant incoming stream.

32. A method as claimed in claim 31, wherein step (a) further comprises: cooling the pressurized first reactant incoming stream.

33. A method as claimed in claim 23, 24, 27, 28 or 30, wherein step (e) comprises recirculating at least a portion of the second reactant exhaust stream in variable flow rate from the second reactant outlet.

* * * * *